United States Patent
Stirling-Gallacher et al.

(10) Patent No.: US 10,595,321 B2
(45) Date of Patent: *Mar. 17, 2020

(54) SYSTEM AND METHOD FOR INTERFERENCE COORDINATION IN WIRELESS COMMUNICATIONS SYSTEMS

(71) Applicant: Futurewei Technologies, Inc., Plano, TX (US)

(72) Inventors: Richard Stirling-Gallacher, San Diego, CA (US); Lili Zhang, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,106

(22) Filed: Apr. 17, 2018

(65) Prior Publication Data
US 2018/0242329 A1    Aug. 23, 2018

Related U.S. Application Data

(63) Continuation of application No. 14/657,494, filed on Mar. 13, 2015, now Pat. No. 9,980,270.

(51) Int. Cl.
*H04W 72/08* (2009.01)
*H04W 72/12* (2009.01)

(52) U.S. Cl.
CPC ..... *H04W 72/082* (2013.01); *H04W 72/1226* (2013.01)

(58) Field of Classification Search
None
See application file for complete search history.

(56) References Cited

U.S. PATENT DOCUMENTS

| | | | |
|---|---|---|---|
| 9,872,337 B2* | 1/2018 | Ayach | H04B 10/114 |
| 9,980,270 B2* | 5/2018 | Stirling-Gallacher | H04W 72/1226 |
| 2009/0197590 A1* | 8/2009 | Borran | H04W 52/242 455/423 |
| 2009/0247084 A1 | 10/2009 | Palanki | |
| 2010/0255852 A1 | 10/2010 | Chen | |
| 2011/0095961 A1 | 4/2011 | Johansson et al. | |
| 2011/0097998 A1 | 4/2011 | Ko et al. | |
| 2012/0322437 A1* | 12/2012 | Fan | H04W 72/082 455/422.1 |

(Continued)

FOREIGN PATENT DOCUMENTS

| | | |
|---|---|---|
| CN | 102186247 A | 9/2011 |
| CN | 102396293 A | 3/2012 |

(Continued)

OTHER PUBLICATIONS

Acharya, J., et al., "Heterogeneous Networks in LTE-Advanced," Chapter 5: Release 10 enhanced ICIC, Apr. 28, 2014, pp. 103-120.

(Continued)

*Primary Examiner* — Xavier Szewai Wong
(74) *Attorney, Agent, or Firm* — Slater Matsil, LLP

(57) ABSTRACT

A method for reducing interference at a first transmission point (TP) includes receiving a blanking bitmap from a second TP, the blanking bitmap includes an indicator of an interval of time when transmissions occurring on a transmission beam originating from the second TP are adjusted to reduce interference to the first TP, and scheduling communications for a user equipment (UE) served by the first TP in accordance with the blanking bitmap.

20 Claims, 9 Drawing Sheets

(56) References Cited

U.S. PATENT DOCUMENTS

| | | |
|---|---|---|
| 2013/0114427 A1 | 5/2013 | Maattanen et al. |
| 2013/0194950 A1 | 8/2013 | Haghighat et al. |
| 2013/0244709 A1 | 9/2013 | Davydov et al. |
| 2013/0265959 A1 | 10/2013 | Lee et al. |
| 2013/0286906 A1 | 10/2013 | Seo et al. |
| 2013/0336270 A1 | 12/2013 | Nagata et al. |
| 2014/0307821 A1* | 10/2014 | Zhang ............... H04L 25/03904 375/267 |
| 2015/0189568 A1* | 7/2015 | Stanze ............. H04W 36/0077 370/331 |
| 2015/0296430 A1* | 10/2015 | Bakker ............ H04W 36/0094 455/444 |
| 2015/0382268 A1 | 12/2015 | Hampel et al. |
| 2016/0036571 A1 | 2/2016 | Park et al. |
| 2016/0065284 A1 | 3/2016 | Yu et al. |
| 2016/0066315 A1 | 3/2016 | Zhang |
| 2016/0099791 A1* | 4/2016 | Cui ..................... H04J 11/0053 370/329 |
| 2016/0211955 A1 | 7/2016 | Wu |
| 2016/0345216 A1 | 11/2016 | Kishiyama et al. |

FOREIGN PATENT DOCUMENTS

| | | |
|---|---|---|
| CN | 104145513 A | 11/2014 |
| CN | 104221301 A | 12/2014 |
| JP | 2012147125 A | 8/2012 |
| WO | 2013112971 A1 | 8/2013 |
| WO | 2013145046 A1 | 10/2013 |
| WO | 2014036699 A1 | 3/2014 |
| WO | 2014169420 A1 | 10/2014 |
| WO | 2015016582 A1 | 2/2015 |

OTHER PUBLICATIONS

"LTE; Evolved Unviersal Terrestrial Radio Access Network (E-UTRAN); X2 Application Protocol (X2AP) (3GPP TS 36.423 version 12.4.2 Release)," ETSI TS 136 423 v12.4.2, Technical Specification, ETSI, Feb. 2015, 205 pages.

Qualcomm, "LTE Advanced: Heterogeneous Networks," Qualcomm Incorporated, Jan. 2011, 15 pages.

* cited by examiner

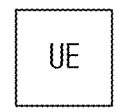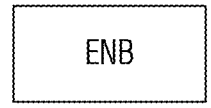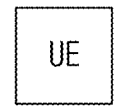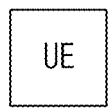
*Fig. 1*

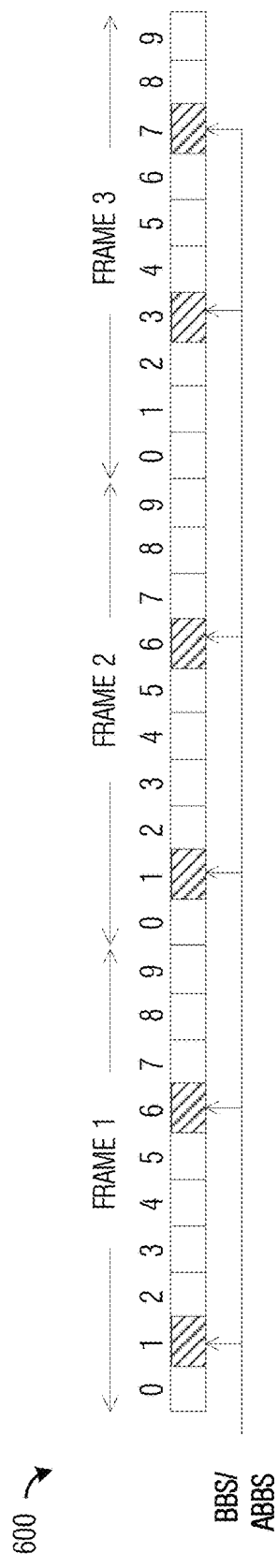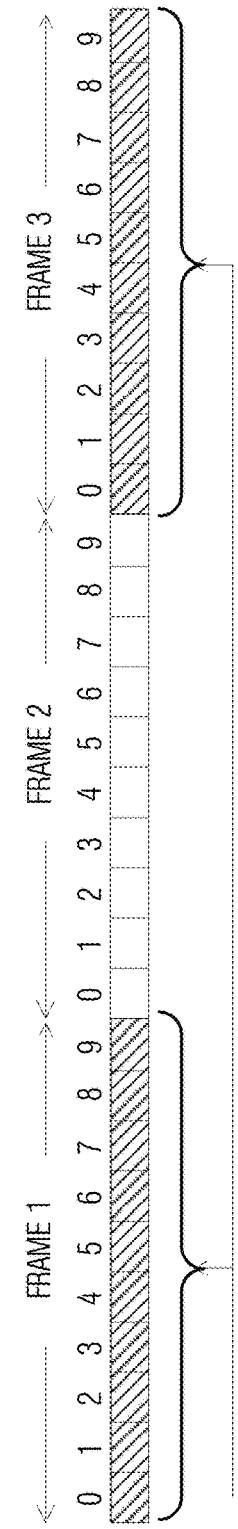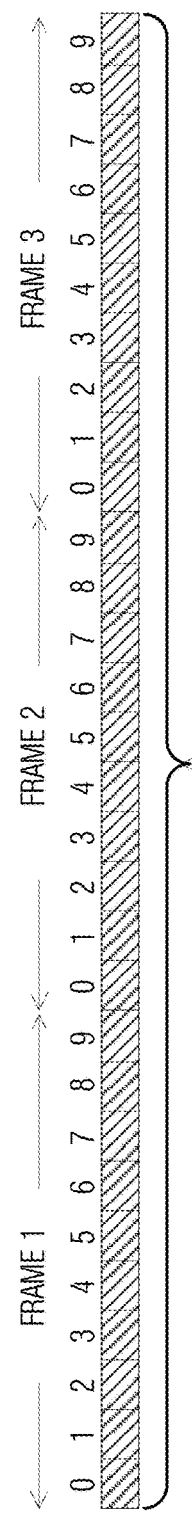

SYSTEM AND METHOD FOR INTERFERENCE COORDINATION IN WIRELESS COMMUNICATIONS SYSTEMS

CROSS-REFERENCE TO RELATED APPLICATIONS

This application is a continuation of U.S. patent application Ser. No. 14/657,494, filed on Mar. 13, 2015, which application is hereby incorporated herein by reference.

TECHNICAL FIELD

The present disclosure relates generally to digital communications, and more particularly to a system and method for interference coordination in wireless communications systems.

BACKGROUND

Intercell interference between adjacent cells of a communications system is a significant problem. The intercell interference can dramatically decrease the performance of communications devices in adjacent cells. Therefore, in the past many interference mitigation schemes have been proposed.

SUMMARY

Example embodiments of the present disclosure which provide a system and method for interference coordination in wireless communications systems.

In accordance with an example embodiment of the present disclosure, a method for reducing interference at a first transmission point (TP) is provided. The method receiving, by the first TP, a blanking bitmap from a second TP, the blanking bitmap includes an indicator of an interval of time when transmissions occurring on a transmission beam originating from the second TP are adjusted to reduce interference to the first TP, and scheduling, by the first TP, communications for a user equipment (UE) served by the first TP in accordance with the blanking bitmap.

In accordance with another example embodiment of the present disclosure, a method for reducing interference caused by a second transmission point (TP) is provided. The method includes receiving, by the second TP, a request to reduce interference to a first TP, and determining, by the second TP, a transmission beam on which transmissions are adjusted, wherein the determining is in accordance with an identifier of the first TP. The method includes configuring, by the second TP, an adjustment and an interval of time for transmissions on the transmission beam in accordance with beam configuring criterion, thereby producing a beam configuration, generating, by the second TP, a blanking bitmap in accordance with the beam configuration; and sending, by the second TP, the blanking bitmap to the first TP.

In accordance with another example embodiment of the present disclosure, a first transmission point (TP) is provided. The first TP includes a processor, and a computer readable storage medium storing programming for execution by the processor. The programming including instructions to receive a blanking bitmap from a second TP, the blanking bitmap including an indicator of an interval of time when transmissions occurring on a transmission beam originating from the second TP are adjusted to reduce interference to the first TP, and schedule communications for a user equipment (UE) served by the first TP in accordance with the blanking bitmap.

In accordance with another example embodiment of the present disclosure, a second transmission point (TP) is provided. The second TP includes a processor, and a computer readable storage medium storing programming for execution by the processor. The programming including instructions to receive a request to reduce interference to a first TP, determine a transmission beam on which transmissions are adjusted, wherein the determining is in accordance with an identifier of the first TP, configure an adjustment and an interval of time for transmissions on the transmission beam in accordance with beam configuring criterion, thereby producing a beam configuration, generate a blanking bitmap in accordance with the beam configuration, and send the blanking bitmap to the first TP.

One advantage of an embodiment is that transmissions in some beam directions are modified for specified periods of time, thereby allowing other users to be scheduled for communications at reduced interference.

A further advantage of an embodiment is that some forms of modifications to the transmissions will permit devices to maintain synchronization with the communications system, therefore, minimizing impact on overall communications system performance.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 1 illustrates an example communications system according to example embodiments described herein;

FIG. 6a illustrates an example sequence of frames highlighting BBS according to example embodiments described herein;

FIG. 6b illustrates an example sequence of frames highlighting BBF according to example embodiments described herein;

FIG. 6c illustrates an example sequence of frames highlighting BB according to example embodiments described herein;

DETAILED DESCRIPTION OF ILLUSTRATIVE EMBODIMENTS

Figure 2A:
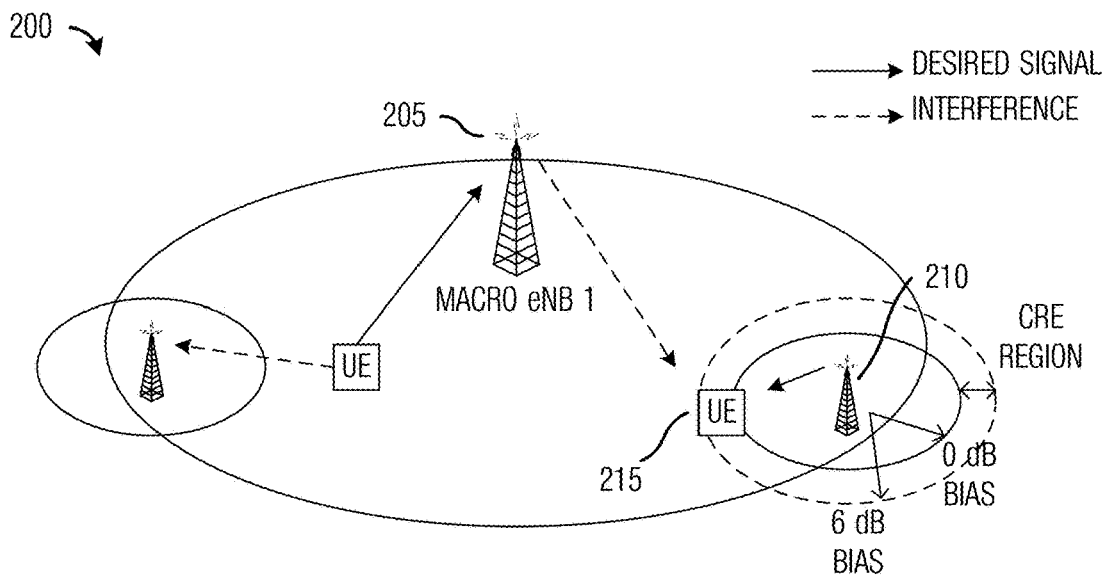
FIG. 2a illustrates an example HetNet highlighting the CRE concept according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to interference coordination in wireless communications systems. For example, a first transmission point (TP) receives a blanking bitmap from a second TP, the blanking bitmap includes an indicator of an interval of time when transmissions occurring on a transmission beam originating from the second TP are adjusted to reduce interference to the first TP, and schedules communications for a user equipment (UE) served by the first TP in accordance with the blanking bitmap.

The present disclosure will be described with respect to example embodiments in a specific context, namely communications systems that use interference coordination in wireless communications systems. The disclosure may be applied to standards compliant communications systems, such as those that are compliant with Third Generation Partnership Project (3GPP), IEEE 802.11, and the like, technical standards, and non-standards compliant communications systems, that use interference coordination in wireless communications systems. The wireless communications systems may be a homogeneous network or a heterogeneous network (HetNet).

FIG. 1 illustrates an example communications system 100. Communications system 100 includes an evolved NodeB (eNB) serving a plurality of user equipments (UEs). In a first operating mode, transmissions for UEs as well as transmissions by UEs pass through the eNB. The eNB allocates communications resources for the transmissions to or from the UEs. eNBs may also be commonly referred to as base stations, NodeBs, transmission points, remote radio heads, or access points, and the like, while UEs may also be commonly referred to as mobiles, mobile stations, terminals, subscribers, users, and the like. Communications resources may be time resources, frequency resources, code resources, time-frequency resources, and the like.

While it is understood that communications systems may employ multiple eNBs capable of communicating with a number of UEs, only one eNB, and a number of UEs are illustrated for simplicity.

Typically, in a HetNet, a variety of transmission points (e.g., eNBs, base stations, NodeBs, remote radio heads, access points, relays, remote radio heads, transmission points of large cells, small cells, pico cells, femto cells, and the like) are present. The variety of transmission points may be deployed in such a way that there are coverage area overlaps with shared operating frequencies. The transmission points may vary in terms of capability as well as transmit power level. As an illustrative example, eNBs may be full featured transmission points with that are capable of transmitting at a high power level and therefore can serve UE in a large cell area, while pico cells may be transmission points with limited features and transmit only at a lower transmit power level and serve UE in a smaller cell area.

Generally, in a HetNet, transmission points that are transmitting at a high power level (hereby referred to herein as large cell transmission points) produce significantly interference to UEs that are connected to transmission points that are transmitting at a lower power level (hereby referred to small cell transmission points), while the interference caused by the small cell transmission points to UEs that are operating with the large cell transmission points may be much less. In the interference scenario, the large cell transmission points may be referred to as aggressor transmission points serving UEs operating in an aggressor cell, and the small cell transmission points are serving UEs operating in a victim cell.

In 3GPP LTE Release 10, a technique referred to as almost blank sub-frames (ABS) was introduced to reduce interference in a HetNet environment. With ABS, aggressor transmission points blanks out the usage of some data sub-frames to minimize interference to the victim cell and UEs operating therein. ABS is particular useful when a cell association of the victim cell is extended using a cell range extension (CRE) concept, since some of the UEs connected to the small cell transmission points may be closer to the aggressor transmission point and experience more interference.

FIG. 2a illustrates an example HetNet 200 highlighting the CRE concept. HetNet 200 includes a large cell transmission point 205 and several small cell transmission points deployed within the coverage area of large cell transmission point 205, including small cell transmission point 210. A UE 215 is served by small cell transmission point 210 while operating within the CRE region of small cell transmission point 210. However, since the transmissions of large cell transmission point 205 are at a higher power level than the transmissions of small cell transmission point 205, especially since UE 215 is operating within the CRE region, significant interference is caused by large cell transmission point 205 to UE 215.

Figure 2B:
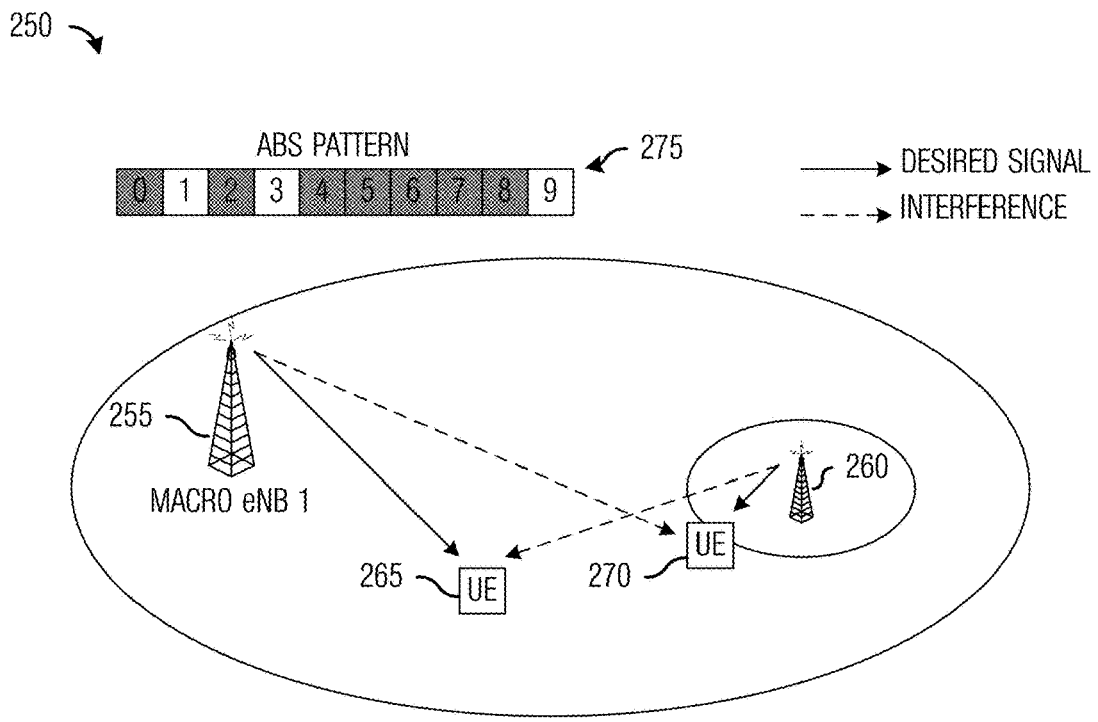
FIG. 2b illustrates an example HetNet highlighting ABS operation according to example embodiments described herein.

FIG. 2b illustrates an example HetNet 250 highlighting ABS operation. HetNet 250 includes a large cell transmission point 255 and a small cell transmission point 260. Large cell transmission point 255 is serving a UE 265 and small cell transmission point 260 is serving UE 270. When large cell transmission point 255 is transmitting to UE 265, it is also causing significant interference to UE 270. However, large cell transmission point 255 features ABS operation. An example ABS pattern 275 is shown in FIG. 2b, wherein large cell transmission point 255 transmits data to UE 265 (as well as potentially other UEs) during subframes 0, 2, 4, 5, 6, 7, and 8. However, large cell transmission point 255 is blanked during subframes 1, 3, and 9 (meaning that large cell transmission point 255 is making no data transmissions during subframes 1, 3, and 9, control signals are however still transmitted), allowing small cell transmission point 260 to transmit to UE 270 without undue interference from transmissions made by large cell transmission point 255. The ABS pattern is known by both large cell transmission point 255 and small cell transmission point 260 so that they know when they can and cannot transmit.

Figure 3A:
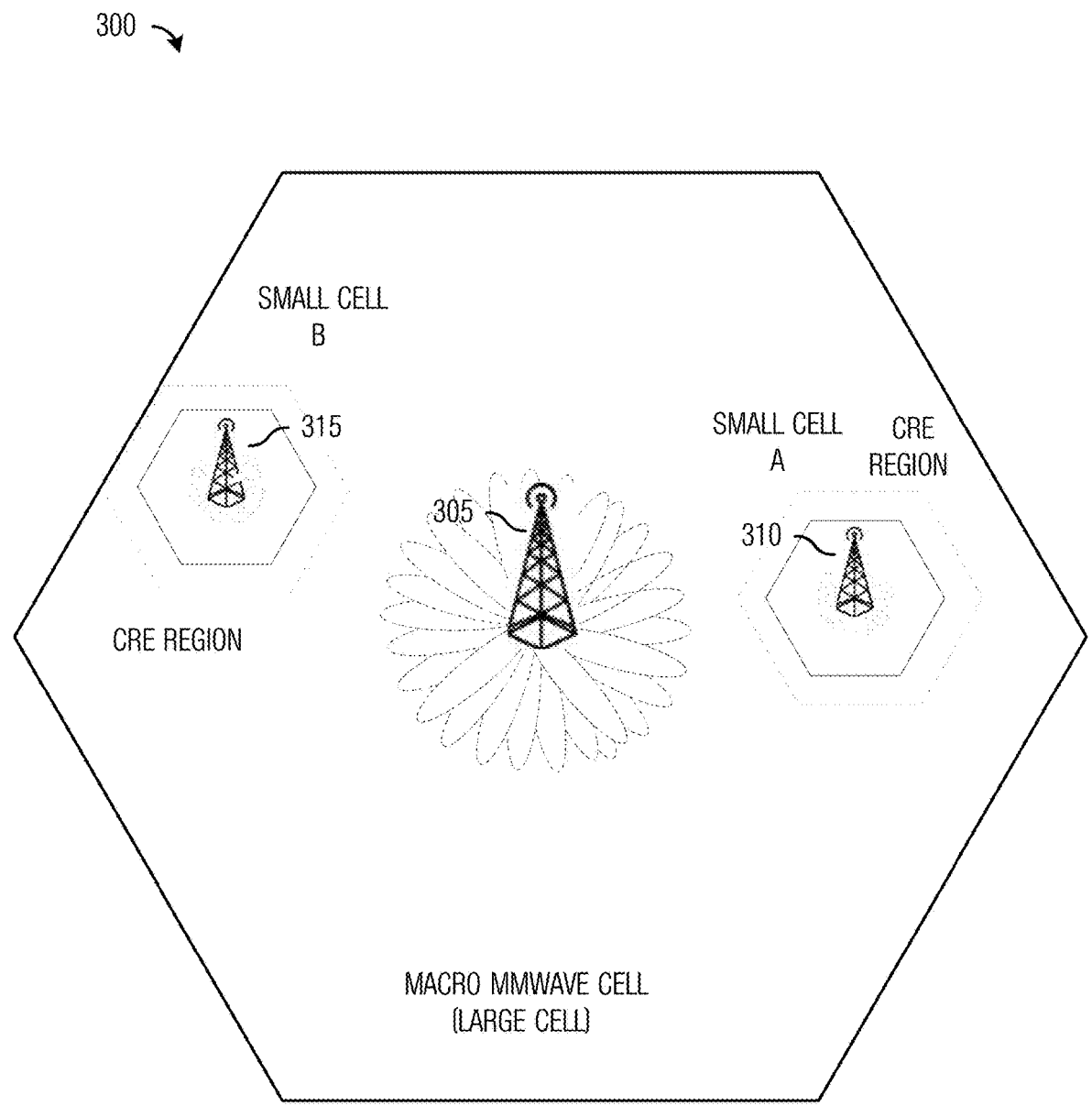
FIG. 3a illustrates an example HetNet millimeter wave (mmWave) communications system according to example embodiments described herein.

FIG. 3a illustrates an example HetNet millimeter wave (mmWave) communications system 300. HetNet mmWave communications system 300 may include a plurality of large cell transmission points, such as large cell transmission point 305, and a plurality of small cell transmission points, such as small cell transmission point 310 and 315. A large cell transmission point may also be referred to as a macro mmWave transmission point or a macro mmWave cell, and a small cell transmission point may also be referred to as a small transmission point or a small cell. While it is understood that a HetNet mmWave communications systems may employ multiple large cell transmission points and multiple small cell transmission points capable of communicating with a number of UEs, only one large cell transmission point, and two small cell transmission points are illustrated for simplicity.

In general, a transmission beam is used to describe a spatial directivity of a transmission(s). A transmission beam may be realized by applying a precoder (which may be a vector of phase coefficients) associated with the transmission beam to an antenna array. As an illustrative example, transmission point may have a set of precoders stored in its memory. In order to generate a transmission beam, the transmission point may select a precoder that is associated with the transmission beam or most closely associated with the transmission beam and apply the phase coefficients of the selected precoder to the antenna array.

In a communications system with 2-dimensional transmission beams, the spatial directivity is solely in an azimuth direction or an elevation direction, while in a communications system with 3-dimensional transmission beams, the spatial directivity may include both azimuth and elevation directivity. A transmission may be said to be transmitted on a transmission beam when it has the same spatial directivity as the transmission beam.

Figure 3B:
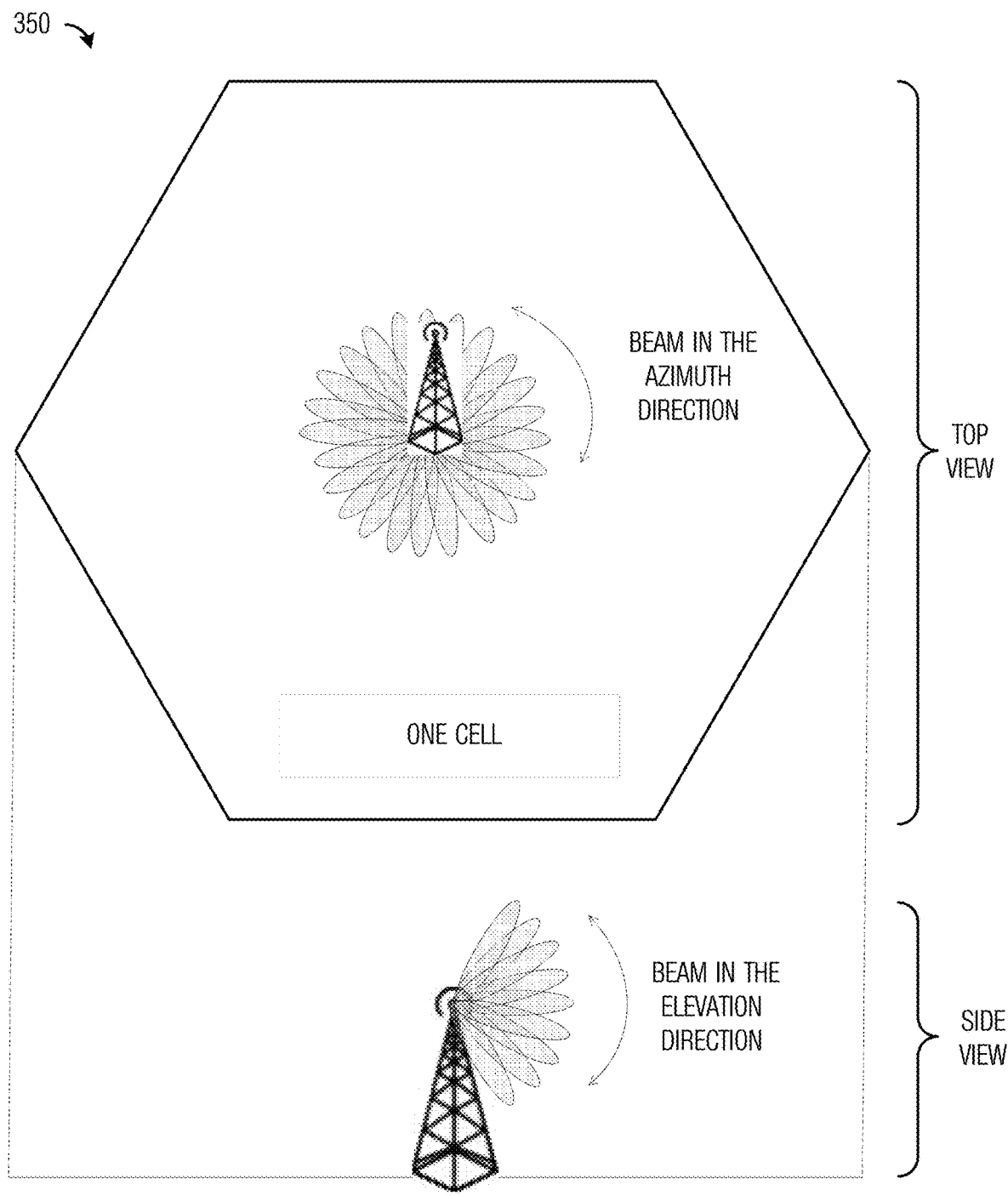
FIG. 3b illustrates example communications system highlighting transmission beams in azimuth and elevation directions according to example embodiments described herein.

FIG. 3b illustrates example communications system 350 highlighting transmission beams in azimuth and elevation directions. As shown in FIG. 3b, a top view highlights transmission beams in the azimuth direction and a side view highlights transmission beams in the elevation direction.

According to an example embodiment, a technique to reduce interference by adjusting transmissions on transmission beam(s) from interferer transmissions points that may cause interference to victim cell(s) is proposed. In general, only transmissions on transmission beam(s) that are directed towards the victim cells (or the coverage area of the small cell transmission point) are adjusted. The transmissions on the transmission beam(s) may be adjusted for specified periods of time, such as sub-frames, frames, multiple frames, and the like, allowing the victim cell's transmission point(s) to transmit without suffering undue interference. UEs served by the victim cell's transmission point(s), especially those in the CRE regions are especially susceptible to interference from the aggressor transmission point.

According to an example embodiment, transmissions on transmission beams may be completely blanked out. In other words, no transmissions (data or control signals) take place on these transmission beams. This situation is referred to as blanked transmission beams.

According to an example embodiment, some transmissions on transmissions beams may be blanked out. As an illustrative example, data transmissions on the transmissions beams are blanked out, while control transmissions are allowed to take place on the transmissions beams. This situation is referred to as almost blanked transmission beams. Almost blanked transmission beams may be useful in situations such as dual connectivity when UEs are served by both aggressor transmission points and victim cell's transmission points, and when UEs that are served by the aggressor transmission points are located within the transmission beams selected for blanking. UEs served by the victim cell's transmission points may suffer some interference from the control transmissions when almost blank transmission beams are used. When almost blank transmission beams are not used, the transmission beams may be used to transmit data and control transmissions.

Figure 4:
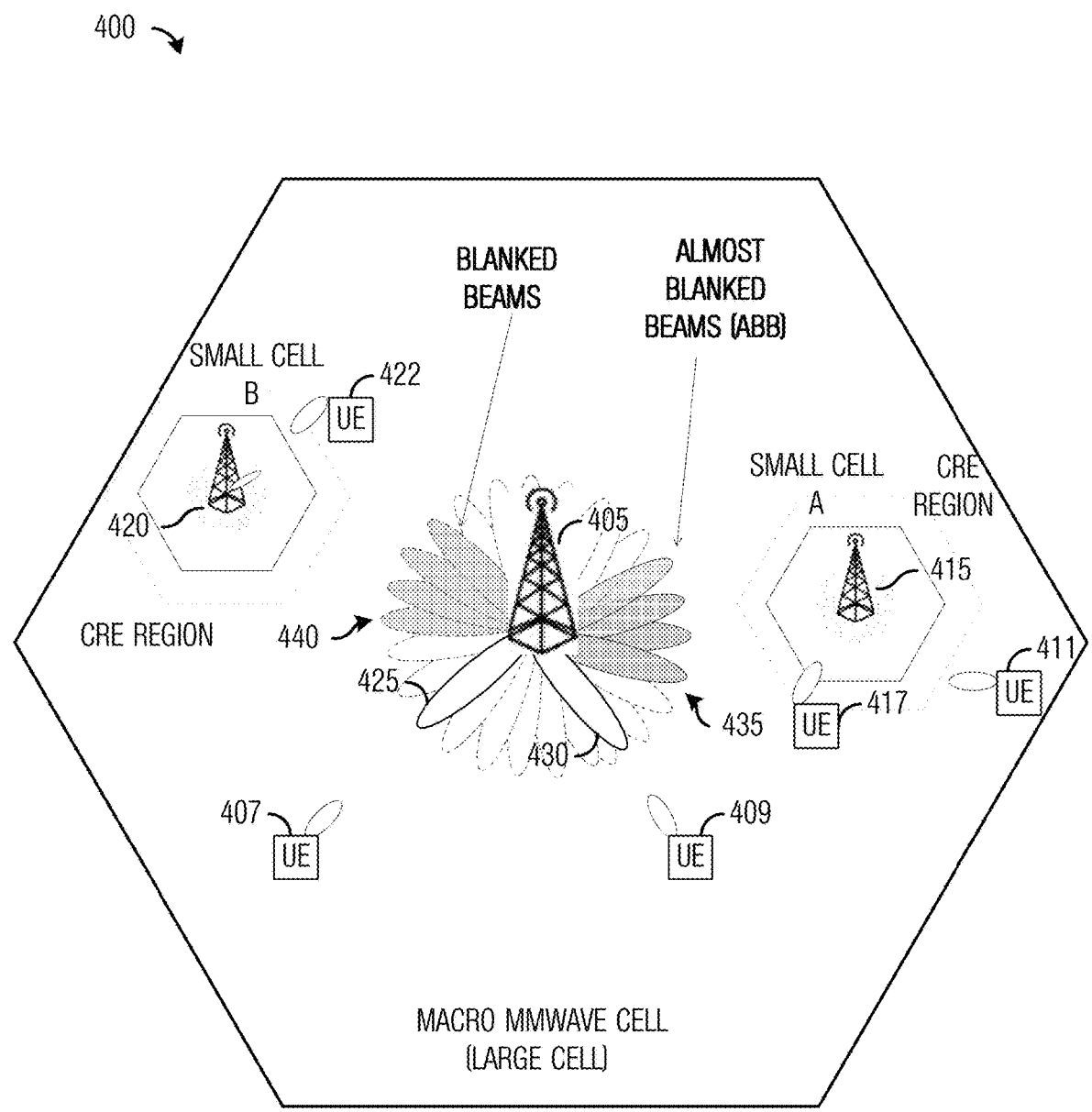
FIG. 4 illustrates an example HetNet mmWave communications system highlighting the adjusting of transmissions on transmission beams according to example embodiments described herein.

FIG. 4 illustrates an example HetNet mmWave communications system 400 highlighting the adjusting of transmissions on transmission beams. HetNet mmWave communications system 400 includes a large cell transmission point 405 that is serving a plurality of UEs, such as UE 407, UE 409, and UE 411. HetNet mmWave communications system 400 also includes a plurality of small cell transmission points, such as small cell transmission point 415 serving a UE 417 and small cell transmission point 420 serving a UE 422. It is noted that UE 411 is located outside of the coverage area of small cell transmission point 415 so it is served by large cell transmission point 405 although small cell transmission point 415 is located between large cell transmission point 405 and UE 411.

Since there are no small cells in-between large cell transmission point 405 and UE 407 and UE 409, large cell transmission point 405 may use transmission beam 425 to transmit to UE 407 and transmission beam 430 to transmit to UE 409. It is noted that although a single transmission beam is shown in FIG. 4 to transmit to UE 407 (as well as UE 409), multiple transmission beams may be used by large cell transmission point 405 to transmit to UE 407 (as well as UE 409).

However, small cell transmission point 415 is near large cell transmission point 405 and is actually in-line between large cell transmission point 405 and UE 411, large cell transmission point 405 may select some transmission beams (shown as transmission beams 435) for adjusting transmissions on the selected transmission beams. Since UE 411 is served by large cell transmission point 405, completely blanking all transmissions on the selected transmission beams may result in loss of connectivity, synchronization, and the like, for UE 411. Therefore, data transmissions are blanked for the selected transmission beams while control transmissions are permitted to take place on the selected transmission beams. It is noted that although shown in FIG. 4 as a plurality of transmission beams, a single transmission beam may be selected for adjusting transmissions. Therefore, the discussion of selecting a plurality of transmission beams should not be construed as being limiting to either the scope or the spirit of the example embodiments.

On the other hand, there are no UEs served by large cell transmission point 405 that is near small cell transmission point 420, therefore, to minimize interference on transmissions involving small cell transmission point 420, large cell transmission point may select some transmission beams (shown as transmission beams 440) for adjusting transmissions on the selected transmission beams, wherein the adjusting comprises blocking all transmissions on the selected transmission beams. Since all transmissions are blocked on the selected transmission beams, transmissions between small cell transmission point 420 and UE 422 may occur without any (or with very little) interference from large cell transmission point 405. It is noted that although no transmissions are occurring on the selected transmission beams, some interference from transmissions of large cell transmission point 405 may still occur in the form of reflections of transmissions in other directions on different transmission beams, side lobes of adjacent transmission beams that have not been blanked, and the like.

According to an example embodiment, some or all transmissions on the selected transmissions beams are allowed to take place, but the transmit power level is adjusted (e.g., reduced). This situation is referred to as transmission power adjustment transmission beams. As an illustrative example, data transmissions and control transmissions on the transmissions beams selected for transmission power adjustment transmission beams are reduced by 50%. As another illustrative example, data transmissions on the transmissions beams selected for transmission power adjustment transmission beams are reduced by 50% while control transmissions take place at 100%. As another illustrative example, data transmissions on the transmissions beams selected for transmission power adjustment transmission beams are blanked out (zero power) while control transmissions take place at 50%. It is noted that reducing the transmit power level by 50% is intended as only an illustrative example for discussion purposes and that other percentages for reducing the transmit power level are possible. Additionally, multiple reduced transmit power levels are possible. As an alternative to 50%, possible reduced transmit power levels include any reduced percentage or fraction of the transmit power level. Furthermore, different sub-frames and/or frames may have different transmit power levels. Therefore, the discussion of a single reduced transmit power level of 50% should not be construed as being limiting to either the spirit or the scope of the example embodiments.

The adjustment in the transmit power level provides an increased level of flexibility. Altering the transmit power level may allow some UEs that are close to the large cell transmission point to be scheduled while reducing interference to victim cells. Information regarding the altered transmit power level may be exchanged over interfaces, such as an X2 interface, or it may be signaled over higher layer signals (e.g., in the form of a power ratio of physical downlink shared channel (PDSCH) and common reference signal (CRS) and/or channel state information reference signal (CSI-RS)) so that UEs can properly perform demodulation and channel quality indicator (CQI) feedback for the sub-frames and/or frames. However, for the demodulation reference signal (DMRS) signaling regarding the altered transmit power level may not be needed. It is noted that for large reductions in transmit power levels, lower level modulation schemes may be needed.

According to an example embodiment, the techniques presented herein are used to minimize interference for both 2-dimensional transmission beams (i.e., transmission beams with an azimuth directivity or elevation directivity only) and 3-dimensional transmission beams (i.e., transmission beams with both an azimuth and an elevation directivity). Although the discussion has focused on 2-dimensional transmission beams (azimuth transmission beams, for example) with transmissions adjusted to reduce interference, in the situation of 3-dimensional transmission beams, the transmission beams may also involve different elevation directivities.

Figure 5:
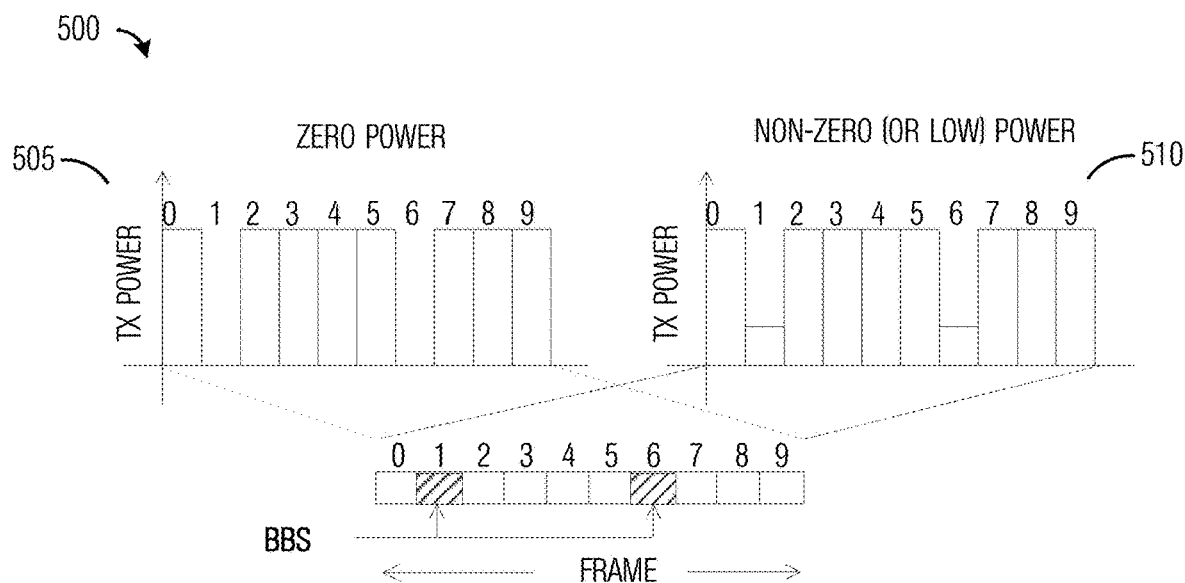
FIG. 5 illustrates an example frame highlighting adjusted transmit power levels according to example embodiments described herein.

FIG. 5 illustrates an example frame 500 highlighting adjusted transmit power levels. As shown in FIG. 5, frame 500 displays BBS operation wherein sub-frames 1 & 6 are allocated for adjustments in transmissions on some transmission beams. A first transmission power graph 505 illustrates transmit power levels for simple on-off transmit power level control. With simple on-off transmit power level control, transmissions on transmission beams selected for interference reduction are not allowed, therefore, there are no signals in sub-frames 1 & 6. A second transmission power graph 510 illustrates transmit power levels for non-zero transmit power level control. With non-zero transmit power level control, transmissions on transmission beams selected for interference reduction are permitted, but at reduced power levels, which are shown as less than maximum transmit power levels in sub-frames 1 & 6.

According to an example embodiment, a duration of the blanked transmission beams, almost blanked transmission beams, transmission power adjustment transmission beams, and combinations thereof, is varied based on beam configuring criteria such as communications system load, aggressor transmission point load, victim cell's transmission point load, aggressor transmission point service history, victim cell's transmission point service history, UE priority, service priority, Quality of Service (QoS) requirements, traffic type, and the like. In other words, the duration of the adjustments to the transmissions may be based on load, as well as service history, priority, QoS, traffic type, and so on. As an illustrative example, if the aggressor transmission point is heavily loaded, it may allocate only short durations of time to allow for adjustments to the transmissions. As another illustrative example, if the victim transmission point is heavily loaded, it may request long durations of time to allow for more low interference transmissions.

According to an example embodiment, the adjustments to the transmissions (blanked transmission beams, almost blanked transmission beams, transmission power adjustment transmission beams (non-zero power), and combinations thereof) may occur on a sub-frame basis. The allocation of sub-frame durations may allow the aggressor transmission point to provide some interference relief to the victim cell while servicing its own high load. This scenario may be referred here collectively as blanked beam sub-frames (BBS), (although in actuality, the beams may be almost blank or non-zero power).

FIG. 6*a* illustrates an example sequence of frames 600 highlighting BBS. As shown in FIG. 6*a*, some of the sub-frames in frames 600 are cross-hatched, indicating that the aggressor transmission point has allowed adjustments to the transmissions on some transmission beams during these sub-frames to help reduce interference to the victim cell. The sub-frames may be specified individually, e.g., sub-frame 1 & 6 of frame 1, sub-frame 1 & 6 of frame 2, and sub-frame 3 & 7 of frame 3. Alternatively, the sub-frames may be specified periodically, e.g., sub-frame 1 & 7 of frames 1-3. The aggressor transmission point may provide information about the sub-frame allocations to the victim cell's transmission point.

According to an example embodiment, the adjustments to the transmissions (blanked transmission beams, almost blanked transmission beams, transmission power adjustment transmission beams (non-zero power), and combinations thereof) may occur on a frame basis. If the aggressor transmission point is relatively lightly loaded, it may be able to allocate frame durations to provide significant interference relief to the victim cell. This scenario may be referred here collectively as to as blanked beam frames (BBF), (although in actuality, the beams may be almost blank or non-zero power).

FIG. 6*b* illustrates an example sequence of frames 630 highlighting BBF. As shown in FIG. 6*b*, some frames in frames 630 are cross-hatched, indicating that the aggressor transmission point has allowed adjustments to the transmissions on some transmission beams during these frames to help reduce interference to victim cell's transmission points. The frames may be specified individually, e.g., frames 1 and 3. Alternatively, the frames may be specified periodically, e.g., every N-th frame starting at frame 1, where N is an integer value. The aggressor transmission point may provide information about the frame allocations to the victim cell's transmission point.

According to an example embodiment, the adjustments to the transmissions (blanked transmission beams, almost blanked transmission beams, transmission power adjustment transmission beams (non-zero power), and combinations thereof) may occur on a multiple frame (or extended time) basis. If the aggressor transmission point is lightly loaded, especially in certain directions, it may allocate multiple frame durations to provide extended interference relief to the victim cell's transmission point. This scenario may be referred to as blanked beams (BB), (although in actuality, the beams may be almost blank or non-zero power).

FIG. 6c illustrates an example sequence of frames 660 highlighting BB. As shown in FIG. 6c, all frames in frames 660 are cross-hatched, indicating that the aggressor transmission point has allowed adjustments to the transmissions on some transmission beams during these frames to help reduce interference to the victim cell. The aggressor transmission point may specify a duration or a number of frames, e.g., 3 frames starting at frame 1, 30 ms starting at frame 1, and the like. Alternatively, the frames may be specified periodically, e.g., 3 frames starting at frame 1 and repeating every N-th frame, where N is an integer value. The aggressor transmission point may provide information about the frame allocations to the victim cell's transmission point.

According to an example embodiment, the techniques presented herein involving adjusting transmissions made on transmission beams to reduce interference also apply to interference caused to small cells by another small cell since different transmission beams may have different adjustments.

Figure 7:
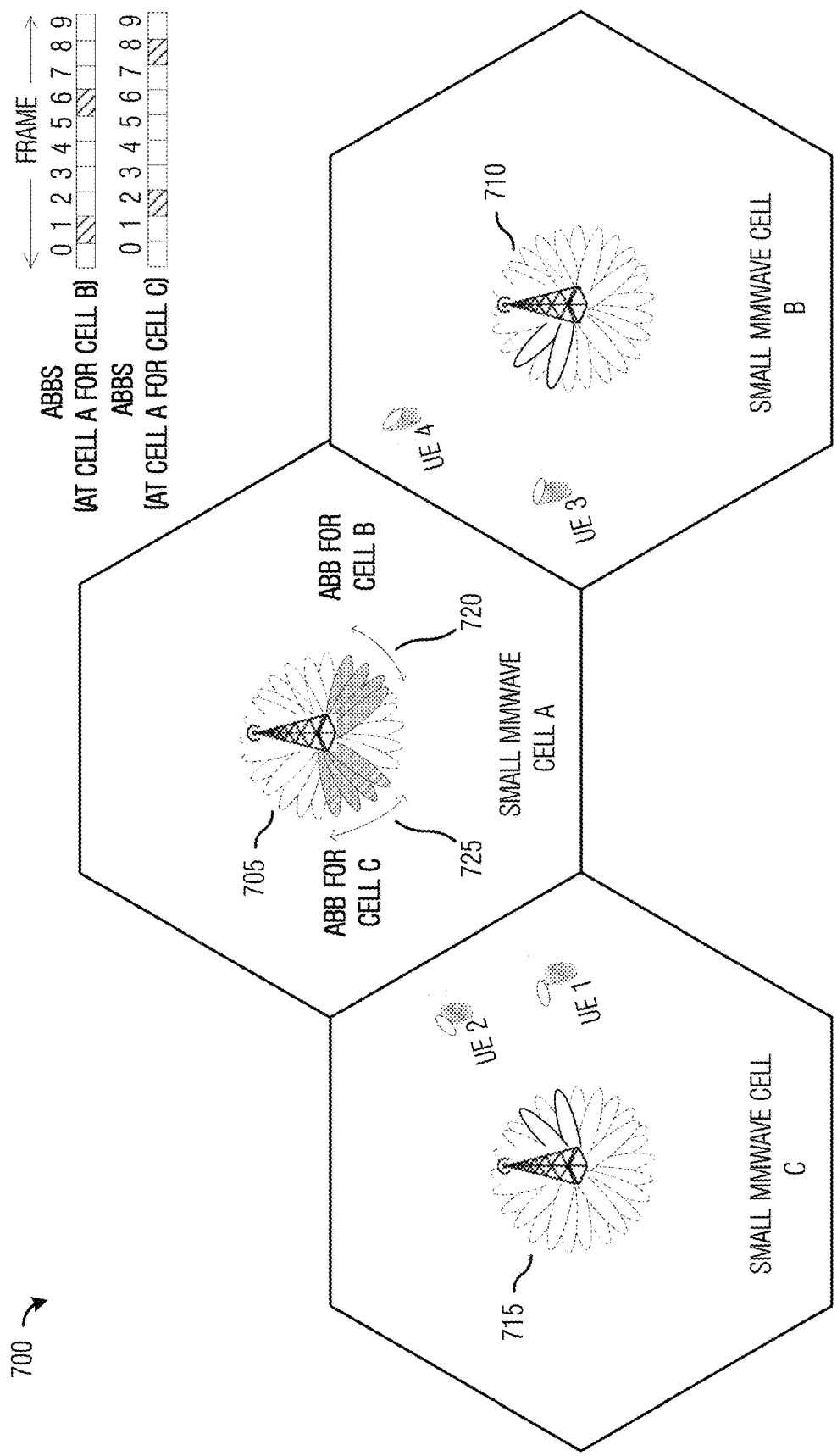
FIG. 7 illustrates an example communications system comprising small cells according to example embodiments described herein.

FIG. 7 illustrates an example communications system 700 comprising small cells. Communications system 700 includes a plurality of small cells, such as small cell 705, small cell 710, and small cell 715. While it is understood that communications systems may employ multiple small cells capable of communicating with a number of UEs, only three small cells, and a number of UEs are illustrated for simplicity. Furthermore, communications system 700 may also include small cell transmission points, which are not shown herein.

As shown in FIG. 7, small cell 705 may be an aggressor cell, while small cells 710 and 715 may be victim cells. Small cell 705 may select a first set of transmission beams 720 to enable adjustments to transmissions occurring on first set of transmission beams 720 to reduce interference to small cell 710. Similarly, small cell 705 may select a second set of transmission beams 725 to enable adjustments to transmissions occurring on second set of transmission beams 725 to reduce interference to small cell 715. Adjustments to the transmissions on the sets of transmission beams may include blanking all transmissions (blanked beams), blanking some transmissions (almost blanked beams), reducing transmission power levels, or combinations thereof. The adjustments to the transmissions may occur on a sub-frame basis, a frame basis, or multiple frames basis. FIG. 7 illustrates example sub-frame structures of frames transmitted by small cell 705. The sub-frame structures of frames may be signaled using bitmaps, for example. It is noted that different sub-frame (or frame or multiple frame) structures may be used for different sets of transmission beams.

According to an example embodiment, a transmission point that is serving UEs in a victim cell requests that another transmission point (any type of transmission point, such as an eNB, a remote radio head, transmission points of large cells, small cells, pico cells, femto cells, and the like) that it considers to be an aggressor transmission point to configure one or more transmission beams to permit adjustment of transmissions. The request may be sent using an Invoke Indication using the X2 interface, for example.

According to an example embodiment, a transmission point that is an aggressor transmission point uses a beam blanking table that comprises a list of beams that could cause interference to nearby victim cells. The aggressor transmission point may configure one or more transmission beams to permit adjustment of transmissions in accordance with which victim transmission point sent the request. As an illustrative example, the aggressor transmission point may configure one or more transmission beams that are associated with the victim cell's transmission point that sent the request. Alternatively, the aggressor transmission point may configure one or more transmission beams that are oriented towards the victim cell that sent the request. In general, different victim cells may have different transmission beams associated with them.

According to an example embodiment, a transmission point that is an aggressor transmission point informs each victim cell's transmission point regarding a blanking pattern of when sub-frames, or frames that are effected will be occurring and how the transmissions will be adjusted (blanked, almost blanked, adjusted transmission power level, or a combination thereof), as well as a restricted measurement set (e.g., radio resource management (RRM), radio link monitoring (RLM), channel state information (CSI), and the like).

According to an example embodiment, a transmission point that serves UEs in a victim cell uses UE specific radio resource control (RRC) signaling to signal restricted measurement sets to the UEs that it is serving. Additional UE specific RRC signaling may be used to signal to the UEs of the victim cell on how the transmissions will be adjusted (blanked, almost blanked, adjusted transmission power level, or a combination thereof).

Figure 8:
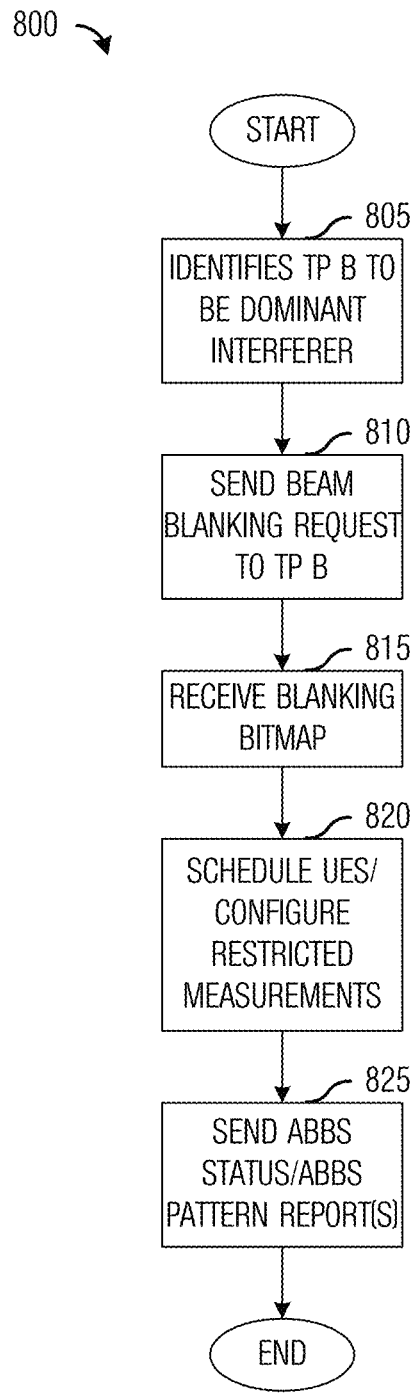
FIG. 8 illustrates a flow diagram of example operations occurring in a victim cell's transmission point according to example embodiments described herein.

FIG. 8 illustrates a flow diagram of example operations 800 occurring in a victim cell's transmission point. Operations 800 may be indicative of operations occurring in a victim cell's transmission point as the victim cell's transmission point participates in interference reduction.

Operations 800 may begin with a transmission point A identifying a transmission point B as a dominant interferer (block 805). As an illustrative example, the transmission point A may identify several transmission points as interferers, but it identifies that transmission point B as the transmission point that causes the greatest interference. In other words, transmission point A is the victim cell's transmission point and transmission point B is the aggressor transmission point. The transmission point A may receive reports of interference measurements or channel quality measurements made by UEs that it is serving, or alternatively the transmission point A may measure interference or channel quality at its receive antennas. The transmission point A may send a request, e.g., a beam blanking request, to the transmission point B (block 810). The request may include identifying information of the transmission point A (such as transmission point ID, cell ID, media access control layer ID, and the like), which may be used by the transmission point B to select one or more transmission beams to enable transmission adjustments.

The transmission point A may receive a blanking bitmap (block 815). The blanking bitmap may inform the transmission point A which sub-frame (or sub-frames or frame or multiple frames) have reduced interference from transmission point B since transmission point B is using transmission beam(s) that enable transmission adjustments in these time periods. As an illustrative example, the blanking bitmap may be 10 bits long to correspond to 10 sub-frames of a single frame and if a bit in the bitmap is set to a first value (e.g., "0"), then a corresponding sub-frame does not include the transmission beam(s) that enable transmission adjustments, while if a bit in the bitmap is set to a second value (e.g., "1"), then a corresponding sub-frame does include the transmission beam(s) that enable transmission adjustments. In general, a single bit may be used for each sub-frame, so if there are 20 sub-frames, there will be 20 bits, while 30 bits would be used for 30 sub-frames. Alternatively, a granularity bit may be included with the blanking bitmap and is used to indicate the granularity of the blanking bitmap, e.g., a single bit to represent sub-frame granularity or frame granularity, along with a bit or bits to represent individual sub-frames or frames. The blanking bitmap may also include a periodic indicator to indicate if the information is periodic or not.

If the adjustments to the transmissions on the transmission beam(s) include blanking or almost blanking, the transmission point A may use UE specific RRC signaling to inform its UEs that such a mode is being used to facilitate interference cancellation of control signal which may still be transmitted with almost blanking.

The transmission point A may schedule transmissions for the UEs that it is serving in accordance with the blanking bitmap (block 820). As an illustrative example, in order to avoid interference from the transmission point B, the transmission point A may schedule transmissions for its UEs for sub-frame (or sub-frames or frame or multiple frames) which have corresponding bits in the blanking bitmap set to the second value. The transmission point A may also configure restricted measurements for its UEs in accordance with the blanking bitmap (block 820).

Transmission point A may subsequently generate a usable blanked beam status (or usable almost blanked beam status) and a blanked beam pattern (or almost blank beam pattern) and sends the usable blanked beam status and the blanked beam pattern to the transmission point B (block 825). Blanked beam patterns may describe which of the almost blank subframe(s) or frame(s) as indicated by the blanking bit map are used to schedule UEs served by transmission point A. This may include sub-frames with overlapping and/or common sub-frames from multiple aggressor transmission points to the transmission point A. The usable blanked beam status may provide a ratio of physical resource blocks (PRBs) of highly interfered UEs in an interval while blanked transmission beams are used to all PRBs in the interval. As an illustrative example, highly interfered UEs may be identified as UEs with:

$$bias\_1 <= RSRP\_aggressor - RSRP\_victim <= bias\_2$$

or $$bias\_1 <= RSRP\ aggressor - RSRQ\_victim <= bias\_2,$$

where RSRP is a reference signal received power and RSRQ is a reference signal received quality, and bias_1 and bias_2 are pre-defined values that may be provided by a technical standard, an operator of the communications system, and the like.

Since the usable blank beam pattern and the blanked beam status describe the scheduling and report interference of UEs served by transmission point A, they may be used by the transmission point B to improve future scheduling of the transmission beams, configuration of the sub-frames (or frame or multiple frames) to improve interference reduction. As an illustrative example, the usable blank beam pattern report from the transmission point A informs the transmission point B which sub-frame(s) or frame(s) it is actually using to schedule its UEs. If the transmission point A is using only a few of the sub-frames which include a transmission beam(s) that enable transmission adjustments, the transmission point B may reduce the number of such sub-frames in the future since these sub-frames are taking away transmission resources from the transmission point B and if they are not being utilized by the transmission point A, the transmission point B may recover some of them for its own use. The useable blank beam pattern report may be feedback information from the transmission point A to the transmission point B informing the transmission point B of the usage of the subframes that include a transmission beam(s) that enable transmission adjustments. As another illustrative example, blanked beam status report from the transmission point A to the transmission point B may inform the transmission point B how many PRBs are experiencing high interference (from the transmissions of the transmission point B). If the number of PRBs is high, the transmission point B may increase the number of subframe(s) or frame(s) that include a transmission beam(s) that enable transmission adjustments in the future.

Figure 9:
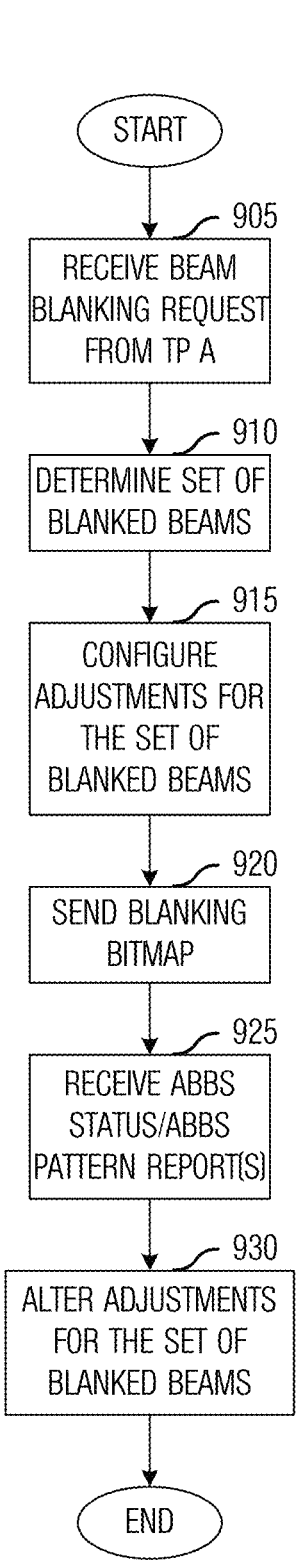
FIG. 9 illustrates a flow diagram of example operations occurring in an aggressor transmission point according to example embodiments described herein.

FIG. 9 illustrates a flow diagram of example operations 900 occurring in an aggressor transmission point. Operations 900 may be indicative of operations occurring in an aggressor transmission point as the aggressor transmission point participates in interference reduction.

Operations 900 may begin with a transmission point B receiving a request, e.g., a beam blanking request, from a transmission point A that is a transmission point of a victim cell (block 905). The request may ask transmission point B to help reduce interference at transmission point B due to transmissions made by transmission point B or to transmissions point B. The request may include identifying information of the transmission point A. The transmission point B may use the identifying information of the transmission point A to determine a set of blanked transmission beams (block 910). The transmission point B may also select precoders associated with the set of blanked transmission beams, which may be applied to an antenna array to produce the set of blanked transmission beams. As an illustrative example, the transmission point B may have a table of closely located transmission points (e.g., neighboring transmission points) and for each of these closely located transmission points, there are an associated set of transmission beams which can cause potential interference when transmission point B transmits on these beams to the respective transmission point. The set of transmission beams may contain zero or more transmission beams. The transmission point B may use the set of transmission beams associated with the transmission point A as the set of blanked transmission beams.

The transmission point B may use the set of blanked transmission beams, as well as beam configuring criteria including its own traffic load, traffic priority, the load of its UEs, the priority of its UEs, historical service information, and the like, to configure the adjustment of the set of blanked transmission beams (block 915). The transmission point B may also make use of previously received usable blank beam pattern and the blanked beam status reports from the transmission point A to configure the adjustment of the set of blanked transmission beams. As an illustrative example, if its own traffic load is heavy (or if the load of its UEs is high), the transmission point B may allocate a small number of sub-frames to enable the adjustment of transmissions on the set of blanked transmission beams. As an illustrative example, if its own traffic load is low (or if the load of its UEs is light), the transmission point B may allocate an entire frame (or multiple frames) to enable the adjustment of transmissions on the set of blanked transmission beams. As yet another illustrative example, if the transmission point A is relatively far away from the transmission point B and if the transmission point B has a number of UEs located in between the transmission point A and itself, the transmission point B may configure transmit power level adjustments of transmissions on the set of blanked transmission beams.

The transmission point B may generate a blanking bitmap based on the configuration of the adjustment of the set of blanked transmission beams and send the blanking bitmap to the transmission point A (block 920). The blanking bitmap may also include other information, such as a periodic indicator to indicate if the information is periodic or not, an indicator of the type(s) of adjustments to the transmissions (e.g., blanked, almost blanked, transmit power level adjustment, or a combination thereof), and the like. The transmission point B may receive a blanked beam status and a usable blanked beam pattern from the transmission point A (block 925). The transmission point B may use the blanked beam status and the usable blanked beam pattern to alter and/or improve the adjustments of the set of blanked transmission beams (block 930). As an illustrative example, if the blanked beam status and the blanked beam pattern indicates that the transmission point A is still receiving heavy interference during an interval when there is an adjustment to transmissions on the set of blanked transmission beams, the transmission point B may change from almost blanked beams mode to blanked beams mode or reduce the transmit power level of the transmissions.

Figure 10:
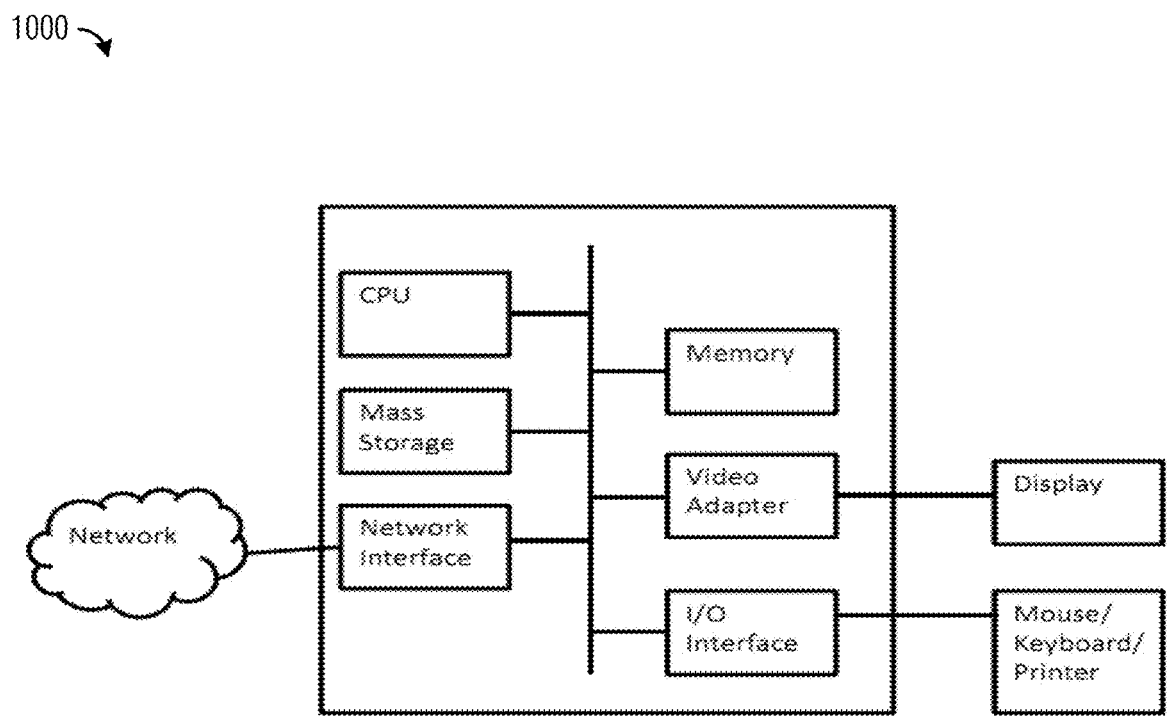
FIG. 10 is a block diagram of a processing system that may be used for implementing the devices and methods disclosed herein.

FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Advantageous features of embodiments may include: A cellular communications system in which one base station (or transmission point) A serving users in the victim cell, identifies another base station (or transmission point) B serving users in the aggressor cell, which is always using beam-forming to be the source of dominant interference and subsequently requests base station B to blank (or mute) the usage of selected beam forming directions. The method could further include the system of above in which base station A is a lower power base station whose area of coverage is contained within a higher power base station B's area of coverage. The method could further include, the system of above in which base station B is a lower power base station whose area of coverage is contained within a higher power base station A's area of coverage. The method could further include the system of above in which base station B and base station A do not have overlapping coverage areas.

The method could further include, the system of above where the blanking of the beams includes transmitting all signals (data and control signals). The method could further include, the system of above where the blanking of the beams is only for data signals. The method could further include, the system of above in which the selection of the beams blanked by base station B depends upon the locations of base station A relative to base station B. The method could further include, the system of above in which the position of base station A is linked to a unique cell ID (or some other unique cell identifier). The method could further include, the system of above in which base station B contains a beam blanking table which lists the set of beams to be blanked for different unique cell IDs corresponding to possible 'victim' base stations.

The method could further include, the system of above in which the unique cell ID of base station A is signaled during the blanking request ('invoke request') to base station B and is used to index the beam blanking table in base station B to determine the selection of the blanked beams. The method could further include, the system of above in which the beams selected to be blanked are blanked for specific sub-frames or specific frames as determined by base station B. The method could further include, the system of above in which base station B signals (via an X2 interface or otherwise) to base station A, the indexes of the specific sub-frames which are to be blanked. The method could further include, the system of above in which base station B signals (via an X2 interface or otherwise) to base station A, the indexes of the specific frames which are to be blanked. The method could further include, the system of above in which base station B signals (via an X2 interface or otherwise) to base station A, an granularity indicator and depending upon the values of the granularity indicator it then signals the index of frame or sub-frames which are to be blanked.

The method could further include, the system of above where base station B additionally signals to base station A for each blanked beam sub-frame 'a beam blanking flag' to indicate if the respective blank sub-frames are fully blank (no transmission at all) or almost blank(only transmission of control signals). The method could further include, the system of above where base station B additionally signals to base station A for each blanked beam frame 'a beam blanking flag' to indicate if the respective blank frames are fully blank (no transmission at all) or almost blank(only transmission of control signals). The method could further include, the system of above where base station B additionally signals to base station A for each blanked beam frame 'a beam blanking flag' to indicate if the respective blank frames are fully blank (no transmission at all) or almost blank(only transmission of control signals). The method could further include, the system of above where base station A ('the victim cell') additionally signals to it connected UEs, (via radio resource control signaling (RRC) or otherwise), whether the blanked sub-frames or blanked frames are fully blank or almost blank.

The method could further include, the system of above where base station A ('the victim cell') additionally signals to it connected UEs, (via radio resource control signaling (RRC) or otherwise), whether the blanked sub-frames or blanked frames are fully blank or almost blank. The method could further include, the system of above in which the victim base station A) signals to the aggressor base station B) the status of the almost blank beam sub-frames. The method could further include, the system of above in which the status of the almost blank sub-frames may be a number related to the percentage of the physical resource blocks for high interface mobile terminals in almost blank sub-frames divided by all used physical resource block from all mobiles connected to the victim cell. The method could further include, the system of above in which high interference mobile terminals are defined using the difference between the reference signal received power (RSRP) of the aggressor cell (B) and the RSRP of the victim cell (A) at the mobile terminal.

The method could further include, the system of above in which high interference mobile terminals are defined using the difference between the reference signal received quality (RSRQ) of the aggressor cell (B) and the RSRQ of the victim cell (A) at the mobile terminal. The method could further include, the system of above in which the victim base station A) signals to the aggressor base station B) the usable almost blank beam pattern. The method could further include, the system of above in which the usable almost blank beam pattern takes into account the sub-frames with overlapping or common sub-frames at the victim base station from all cells which are aggressive to the victim cell. The method could further include, the system of above in which the blanking of the beam for data is not zero power, but instead has a reduced power level. The method could further include, the system of above in which the reduction in power for these lower power or non-zero blanked beams, could be signaled to the connected UEs via higher layer signaling (as power ratio of PDSCH and CRS/CSI-RS). The method could further include, the system of above in which the reduction in power for these lower power or non-zero blanked beams, could be optionally signaled to neighboring base stations over the inter base station interface (i.e. X2 interface).

Although the present disclosure and its advantages have been described in detail, it should be understood that various changes, substitutions and alterations can be made herein without departing from the spirit and scope of the disclosure as defined by the appended claims.

What is claimed is:

1. A method comprising:
   identifying, by a first transmission point (TP) serving user equipments (UEs) in an angular coverage area, a second TP as a source of interference;
   sending, by the first TP directly to the second TP, a request to reduce interference, the request including an identifier of the first TP; and
   receiving, by the first TP, a blanking bitmap from the second TP, the blanking bitmap indicating one or more time periods when transmissions occurring on a set of beams, originating from the second TP and covering the angular coverage area of the first TP, are adjusted to reduce interference to communications of the UEs served by the first TP.

2. The method of claim 1, further comprising serving, by the first TP, the UEs in accordance with the blanking bitmap.

3. The method of claim 1, each of the one or more time periods comprising one of a sub-frame or a frame, in which the transmissions occurring on the beams originating from the second TP are adjusted.

4. The method of claim 1, further comprising:
   generating a usable blanked beam status report including information regarding a ratio of interfered communications resources to all communications resources available during the one or more time periods; and
   sending the usable blanked beam status report to the second TP.

5. The method of claim 4, the communications resources comprising one of time resources, frequency resources, code resources, or time-frequency resources.

6. The method of claim 4, further comprising:
   generating a blanked beam pattern report including information regarding a usage of the communications resources available during the one or more time periods; and
   sending the blanked beam pattern report to the second TP.

7. The method of claim 4, the adjusted transmissions occurring on the beams comprising one of blanked data and control transmissions, or blanked data transmissions.

8. The method of claim 4, the adjusted transmissions occurring on the beams comprising reduced transmit power level transmissions.

9. The method of claim 1, the adjusted transmissions occurring on the beams comprising one of blanked data and control transmissions, or blanked data transmissions.

10. The method of claim 1, the adjusted transmissions occurring on the beams comprising reduced transmit power level transmissions.

11. A first transmission point (TP) serving user equipments (UEs) in an angular coverage area, the first TP comprising:
    a non-transitory memory storage comprising instructions; and
    one or more processors in communication with the non-transitory memory storage, wherein the one or more processors execute the instructions to:
    identify a second TP as a source of interference;
    send, directly to the second TP, a request to reduce interference, the request including an identifier of the first TP; and receive a blanking bitmap from the second TP, the blanking bitmap indicating one or more time periods when transmissions occurring on a set of beams, originating from the second TP and covering the angular coverage area of the first TP, are adjusted to reduce interference to communications of the UEs served by the first TP.

12. The first TP of claim 11, wherein the one or more processors execute the instructions to serve the UEs in accordance with the blanking bitmap.

13. The first TP of claim 11, wherein each of the one or more time periods comprises one of a sub-frame or a frame, in which the transmissions occurring on the beams originating from the second TP are adjusted.

14. The first TP of claim 11, wherein the one or more processors execute the instructions to:
generate a usable blanked beam status report including information regarding a ratio of interfered communications resources to all communications resources available during the one or more time periods; and
send the usable blanked beam status report to the second TP.

15. The first TP of claim 14, wherein the communications resources comprise one of time resources, frequency resources, code resources, or time-frequency resources.

16. The first TP of claim 14, wherein the one or more processors execute the instructions to:
generate a blanked beam pattern report including information regarding a usage of all of the communications resources available during the one or more time periods; and
send the blanked beam pattern report to the second TP.

17. The first TP of claim 14, wherein the adjusted transmissions occurring on the beams comprise one of blanked data and control transmissions, or blanked data transmissions.

18. The first TP of claim 14, wherein the adjusted transmissions occurring on the beams comprise reduced transmit power level transmissions.

19. The first TP of claim 11, wherein the adjusted transmissions occurring on the beams comprise one of blanked data and control transmissions, or blanked data transmissions.

20. The first TP of claim 11, wherein the adjusted transmissions occurring on the beams comprise reduced transmit power level transmissions.

* * * * *